April 30, 1946.  D. S. FAHRNEY  2,399,217
AIRPLANE CARRIER GLIDER
Filed March 13, 1942  4 Sheets-Sheet 1
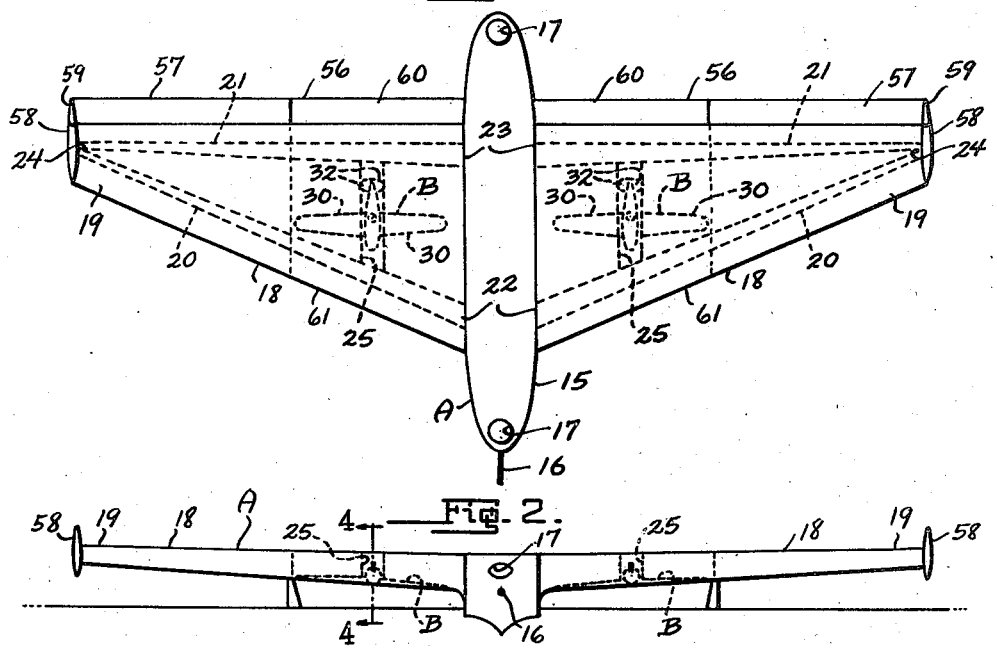
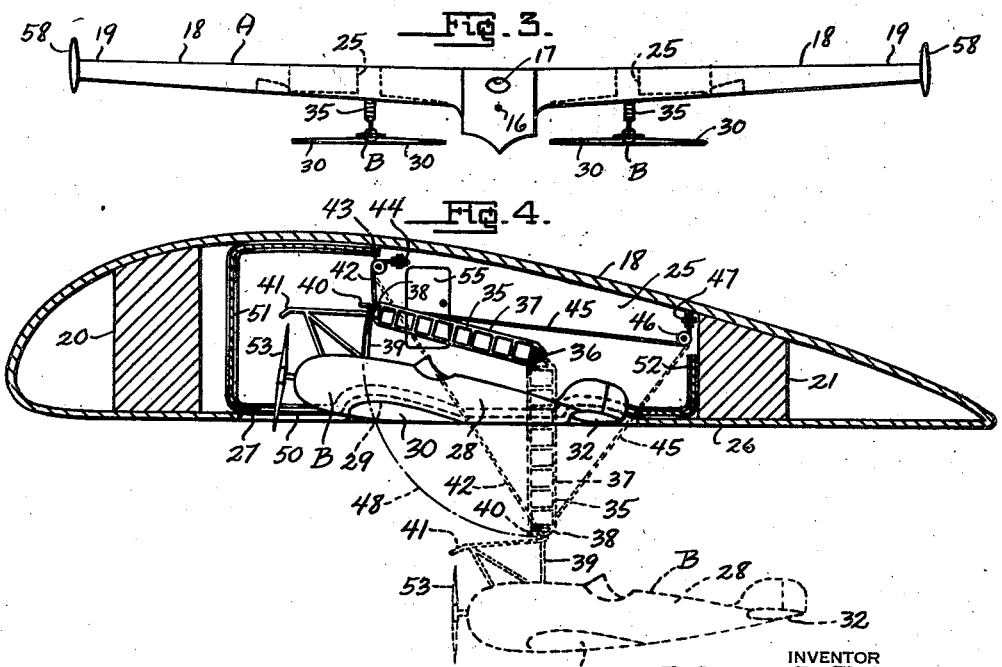
INVENTOR
Delmer S. Fahrney
BY
ATTORNEY

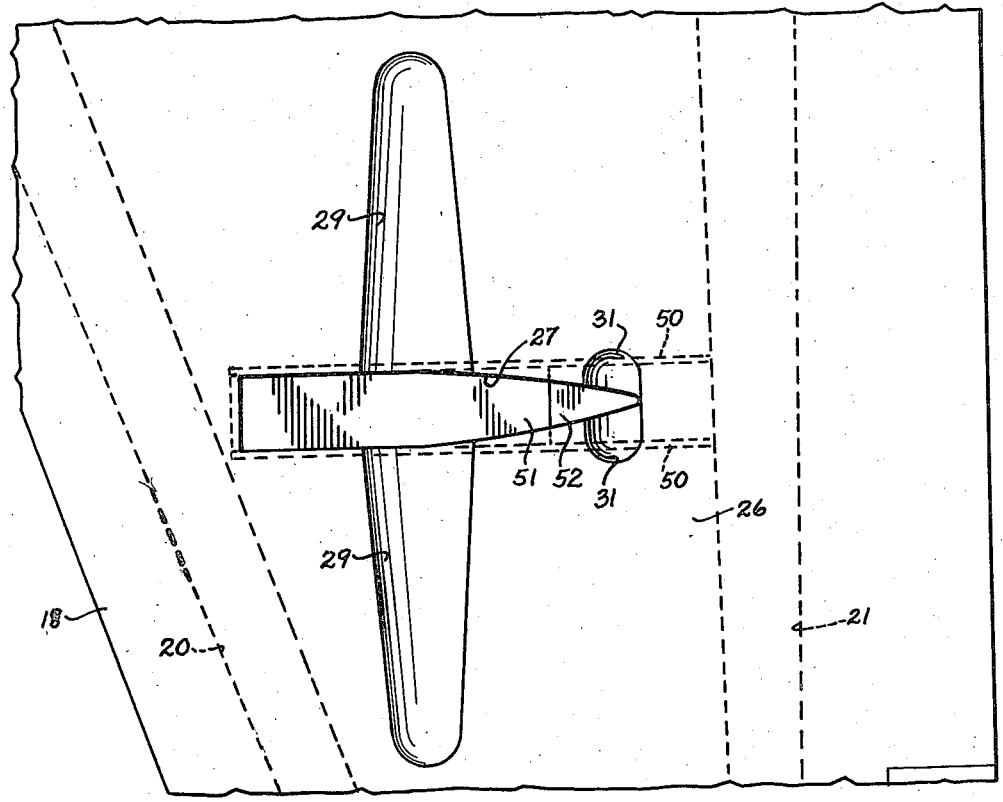
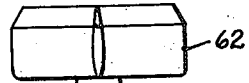
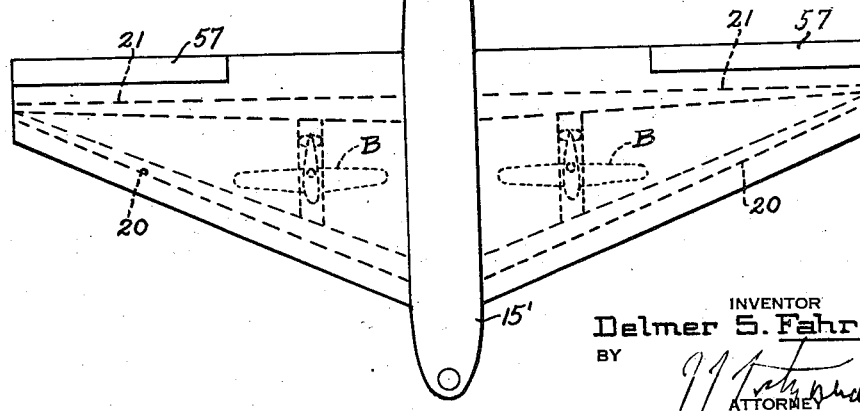

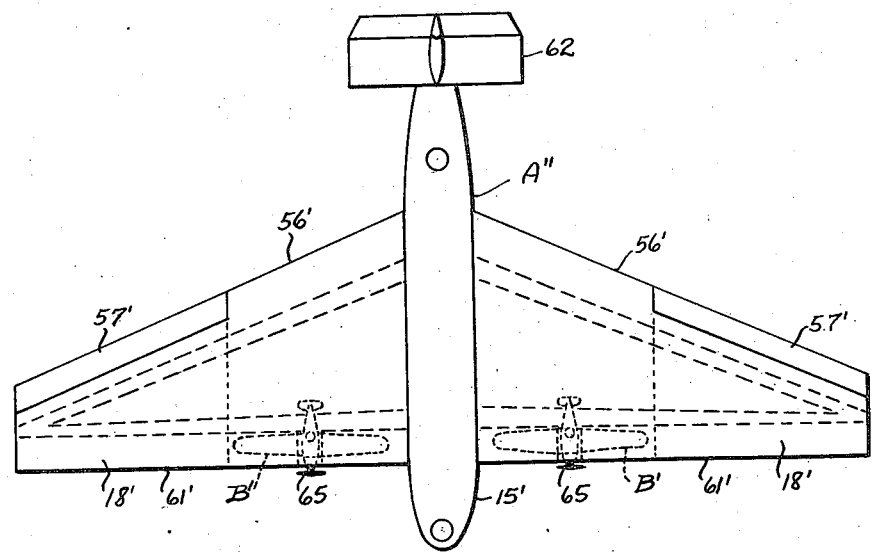
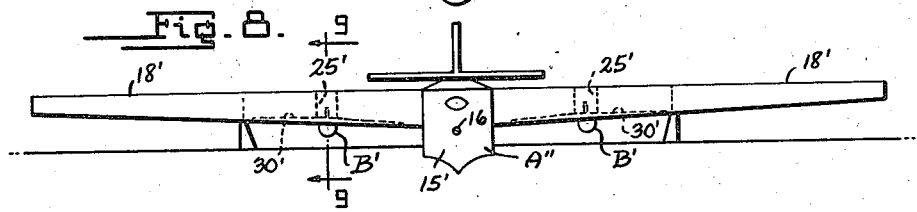
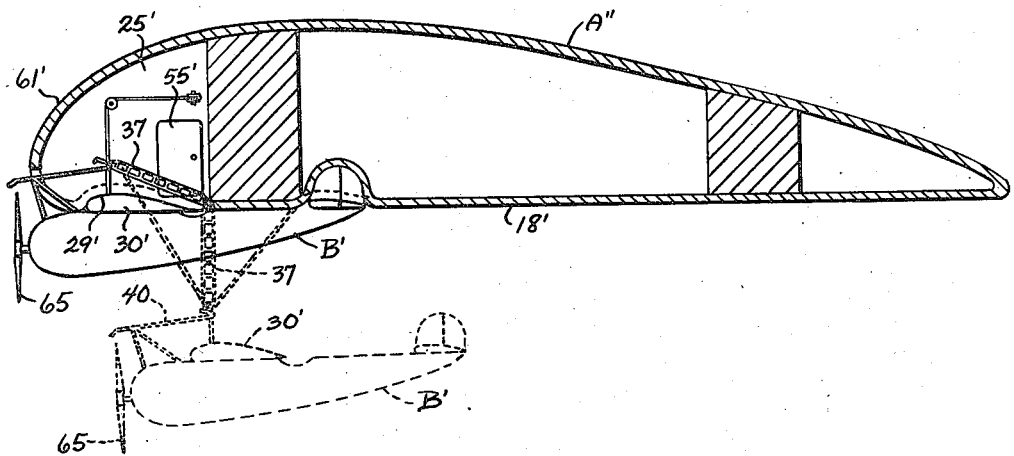

April 30, 1946. D. S. FAHRNEY 2,399,217
AIRPLANE CARRIER GLIDER
Filed March 13, 1942 4 Sheets-Sheet 4
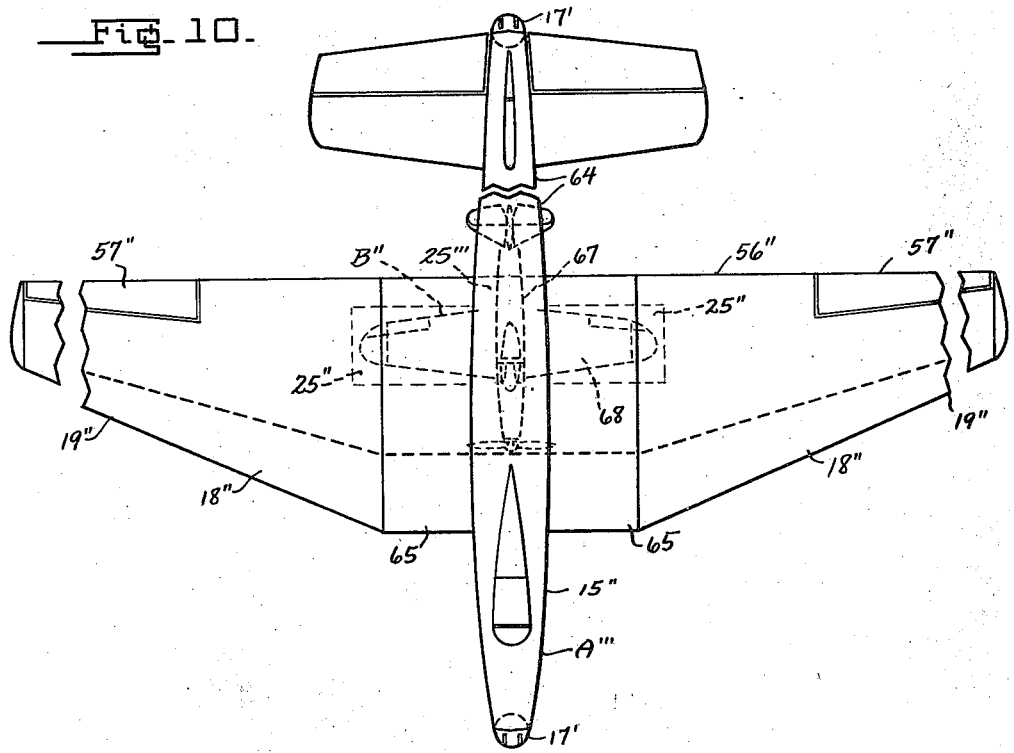
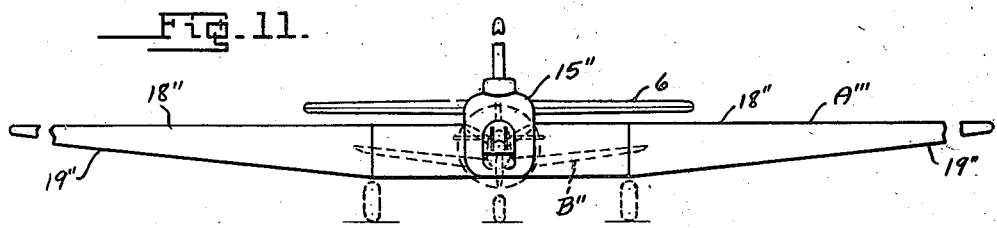
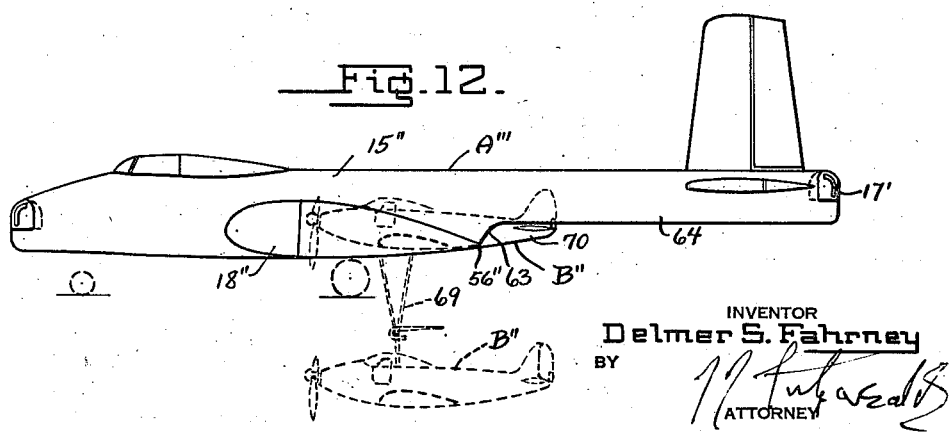
INVENTOR
Delmer S. Fahrney
BY
ATTORNEY Patented Apr. 30, 1946

2,399,217

UNITED STATES PATENT OFFICE 2,399,217

AIRPLANE CARRIER GLIDER

Delmer S. Fahrney, United States Navy

Application March 13, 1942, Serial No. 434,514

1 Claim. (Cl. 244—2)

(Granted under the act of March 3, 1883, as amended April 30, 1928; 370 O. G. 757)

The present invention relates to improvements in aircraft and, more particularly, to a glider aircraft carrier.

It is an object of the invention to provide a glider adapted to carry one or more smaller aircraft, such as fighter airplanes.

Another object of the invention is the provision of a glider having aircraft storage compartments.

A further object of the invention is to provide a glider, such as described, with means for transferring airplanes into and out of storage compartments.

A still further object is the provision of a glider including wings having recesses adapted to receive smaller aircraft, such as fighter planes.

A still further object of the present invention is the provision of a glider having a recess to receive a smaller airplane, the lower portion of the airplane forming a continuous surface with the lower surface of the glider wing, insuring a smooth flow of air over the lower surface of the glider.

A still further object is to provide an improved glider boat.

Yet another object is the provision of a glider aircraft carrier adapted to be towed by another airplane and including means for supporting one or more smaller aircraft, such as fighter airplanes, in a manner whereby the propelling means of the smaller aircraft may serve, if desired, as main or supplementary propelling means for the aircraft carrier.

The invention also resides in the provision of an airplane carrier glider boat adapted to be towed on water or in the air and constituting a portable base for the repair, supply and operation of smaller aircraft.

The invention also aims to provide an airplane carrier glider boat including wings having improved storage arrangements therein and equipped with floats retractable into the wings.

Other objects and advantages of the invention will become apparent during the course of the following detailed description, when taken in connection with the accompanying drawing, forming a part of this specification, and in which drawings;

Figure 1 is a top plan view of a preferred form of tailless aircraft carrier and showing, in broken lines, smaller airplanes carried thereby.

Figure 2 is a view in front elevation of the tailless glider aircraft carrier resting on a body of water with its floats extended, and showing, in broken lines, smaller airplanes carried thereby.

Figure 3 is a view in front elevation of the tailless glider in flight with its floats retracted, and showing the smaller airplanes suspended from the glider.

Figure 4 is a vertical sectional view substantially on the line 4, 4 of Figure 2.

Figure 5 is a fragmentary bottom plan view of a portion of one wing of the glider and showing the recessed under surface of the glider wing.

Figure 6 is a top plan view of a modified form of a glider aircraft carrier provided with a tail.

Figure 7 is a top plan view of a further modified form of glider aircraft carrier.

Figure 8 is a view in front elevation of the glider aircraft carrier shown in Figure 7.

Figure 9 is a vertical sectional view taken substantially on the line 9, 9 of Figure 8.

Figure 10 is a top plan view of another modified form of my glider aircraft carrier and showing in broken lines a smaller airplane carried thereby.

Figure 11 is a front elevational view of the glider aircraft carrier illustrated in Figure 10 and showing in broken lines, a smaller airplane carried thereby.

Figure 12 is a side elevational view of the glider aircraft carrier and showing in broken lines a smaller airplane carried therein and suspended from the glider.

In the drawings, which show preferred and modified forms of the invention, similar reference characters denote corresponding parts throughout the several views. The letters A and A' generally designate preferred and modified forms of glider aircraft carriers for carrying smaller airplanes B, of the low-wing monoplane type, the letter A'' generally designating a further modified form of glider aircraft carrier adapted to carry smaller airplanes B' of the high-wing monoplane type. The letter A''' generally designates a still further modified form of glider aircraft carrier adapted to carry a smaller airplane B''.

The glider aircraft carriers A, A', A'' and A''' may of course be the landplane, seaplane or amphibian type. In the example shown for the purpose of illustration, in Figures 1–5, the carrier A comprises a boat-shaped fuselage or hull 15 provided at its forward end with any suitable type of releasable tow cable 16. At its opposite ends, the hull 15 may be provided with turrets 17 for gunnery or observation purposes. Extending from the opposite sides of the hull 15 are wings 18 tapering in width and thickness from the hull toward their outer end portions 19. These wings 18 are supported by front and rear spars 20, 21 that project from the hull at widely spaced zones 22, 23 and converge at 24 within the tip ends of the wings. Extending between the front and rear spars 20, 21 adjacent the hull are storage compartments 25 adapted to receive airplanes B.

In the lower surface 26 of each wing 18 is formed an elongate opening 27, as shown in Figures 4 and 5, communicating with the storage compartment 25 and of a size to receive the fuselage 28 of the airplane B. Formed in the lower surface 26 at opposite sides of the opening 27 are recesses 29 for receiving the wings 30 of the airplane B, and recesses 31 for receiving its horizontal control surfaces 32 when the fuselage 28 of the airplane is elevated into the storage compartment 25 through the opening 27.

Each storage compartment 25 is provided with airplane elevating and lowering means 35, such as shown in Figure 4 of the drawings. Swingably supported at one end, as by a pivot 36, is a rigid ladder-shaped trapeze 37, terminating at its free end in a triangular-shaped loop 38. Each airplane B is provided with an upstanding frame 39 rigidly supporting, above the center of gravity of the airplane, a hook 40 provided with a forwardly declining shank 41 for guiding the hook 40 into the loop 38. Attached to the loop end 38 of the trapeze is one end of a trapeze lifting and lowering cable 42 that is trained around pulleys 43, 44 for connection to any suitable control mechanism, such as a winch (not shown) for paying out and reeling in the cable 42. Attached to the loop end 38 of the trapeze is one end of a trapeze steadying cable 45 that is trained around pulleys 46, 47 for connection to any suitable control mechanism (not shown). The arrangement is such that by reeling in and paying out the cables 42, 45, the airplane B is swung on the arcuate path 48 between the elevated and lowered positions shown by full and broken lines in Figure 4. Any suitable closure means for the opening 27 may be provided. In the example shown, spaced tracks 50 are mounted at opposite sides of the opening for guiding flexible closure panels 51, 52 between closed and open positions. When the airplane B has been launched and the trapeze elevated, these closure panels 51, 52, when disposed in their closed positions, as illustrated in Figure 5, tend to insure a smooth flow of air over the lower surface 26 of the wing. When the airplane B has been elevated to the position shown in full lines in Figure 4, the fuselage 28 will substantially seal the opening 27 except at the forward end of the opening in the vicinity of the propeller 53. By turning the propeller 53 to a horizontal position, the closure panel 51 may be shifted so as to close the forward end of the opening 27.

Extending between each compartment 25 and the fuselage 15 is a passageway provided with an air-lock door 55 through which the aircraft carrier personnel may enter or leave the compartment. This air-lock door 55 prevents the ingress of air into the other interior spaces of the wing through the compartment opening 27.

The wings of the glider A are provided in their trailing marginal edges 56 with ailerons 57 and at their tips with vertical control surfaces 58 and rudders 59. Also fitted in the trailing marginal edges are flaps 60 that are disposed inwardly of the ailerons. The leading edges 61 of the wings extend outwardly and rearwardly from the hull fuselage 15, as shown.

The modified form of the glider A' differs from the tailless glider A in that its fuselage 15' is provided with conventional tail surfaces 62.

Referring now to Figures 7 to 9, it will be noted that the modified form of glider aircraft carrier A" is provided with a hull or fuselage 15' similar to that of the carrier A' but that the wings 18' thereof are formed so that their trailing marginal edges 56', in which the ailerons 57' are fitted, extend forwardly and outwardly of the hull or fuselage 15'. Formed in the leading edges 61' of the wings 18' are compartments 25' equipped with airplane elevating and lowering means of the general character shown and described in my co-pending U. S. patent application Serial No. 414,430, filed October 10, 1941. Installed in each compartment 25', as shown more particularly in Figure 9, is a trapeze 37 such as previously described, cooperating with a hook 40 on the aircraft B', for elevating and lowering the wings 30' of the smaller aircraft B'. In the example shown, the smaller aircraft B' are of the high-wing monoplane type, and the lower surface of the glider wings are provided with recesses 29' for accommodating the monoplane wings 30' when the aircraft B' is in its elevated position. Extending between each compartment 25' and the fuselage 15' is a passageway provided with an air-lock door 55' that seals the wing against ingress of air through the compartment 25' when the smaller aircraft B' is in its lowered position. From an inspection of Figure 9, it will be observed that the propelling means 65 of the aircraft B' is so positioned exteriorly of the aircraft carrier wing 18' that, if desired, the power of the smaller aircraft may be utilized to drive or assist in the driving of the aircraft carrier A".

Referring now to Figures 10 to 12, it will be noted that the modified form of glider A''' is provided with a hull or fuselage 15" that differs from the fuselages A, A' and A", in that the fuselage A''' at the trailing edge 56" of the wing 18" is provided with a rearwardly facing step 63 whereby the tail 64 of the fuselage is of a uniform reduced height. From an inspection of Figure 10, it will be noted that the wings 18" comprise inner sections 65 of uniform width adjacent the fuselage and outer sections 66 tapering in width and thickness toward their outer end portions 19". The wings of the glider A''' are provided in their trailing marginal edges 56" with ailerons 57". The tail 64 differs from the tail 62 in that a turret 11' is provided in the end thereof. Within the fuselage 15" and the wings 18" of the glider are compartments 25''' and 25" for housing the fuselage 67 and wings 68 of a smaller airplane B". When this smaller airplane B" is carried by the glider, its tail portion 70 is disposed rearwardly of the step 63. The glider may be provided with any suitable airplane elevating and lowering means 69.

Various changes may be made in the forms of invention herein shown and described without departing from the spirit of the invention or the scope of the following claim.

The invention described herein may be manufactured and used by or for the Government of the United States of America for governmental purposes without the payment of any royalties thereon or therefor.

What is claimed is:

An airplane carrier adapted to transport a low wing monoplane, comprising a towable glider including a hollow portion having a lower surface provided with an opening of a size to receive the fuselage of said monoplane, pulleys and cables in said opening, the said cables being trained around said pulleys, a ladder having a loop pivotally mounted in said opening, one end of said cables being connected to one end of said ladder, said monoplane provided at its forward portion with a frame having a horizontal rod portion, said rod adapted for engagement with the loop in said ladder.

DELMER S. FAHRNEY.